Dec. 20, 1966  T. W. MERRITT, SR., ET AL  3,292,580
VACUUM POSITIONED MILK TRANSFER SYSTEM
Filed May 28, 1965  2 Sheets-Sheet 1
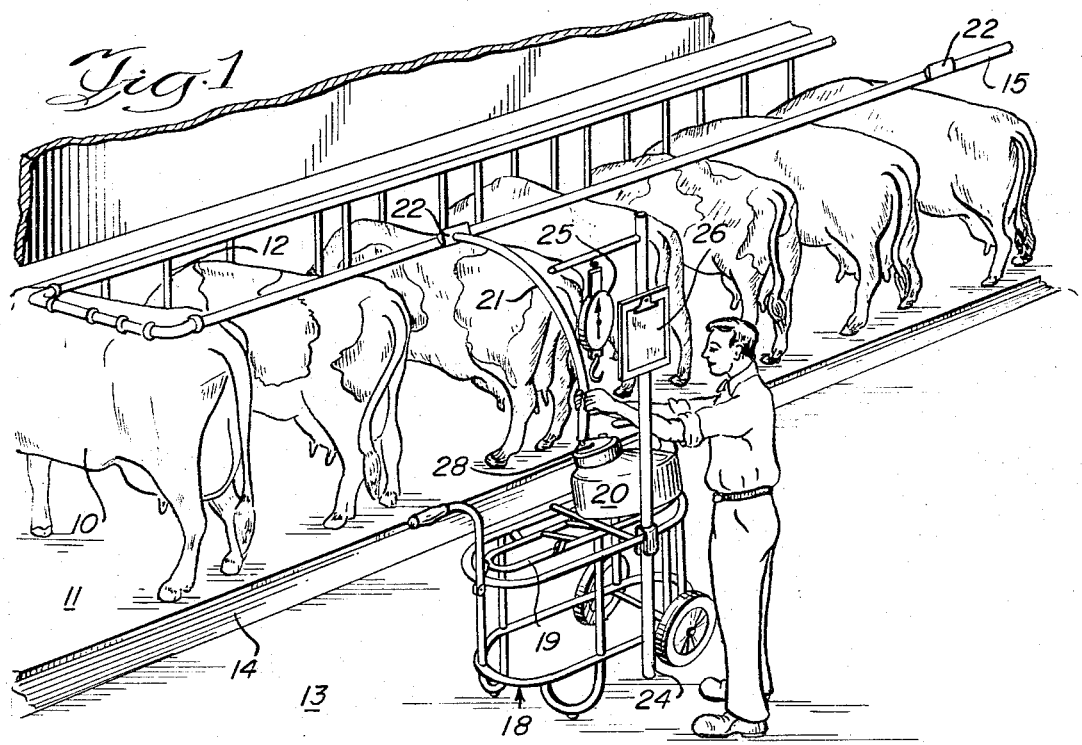
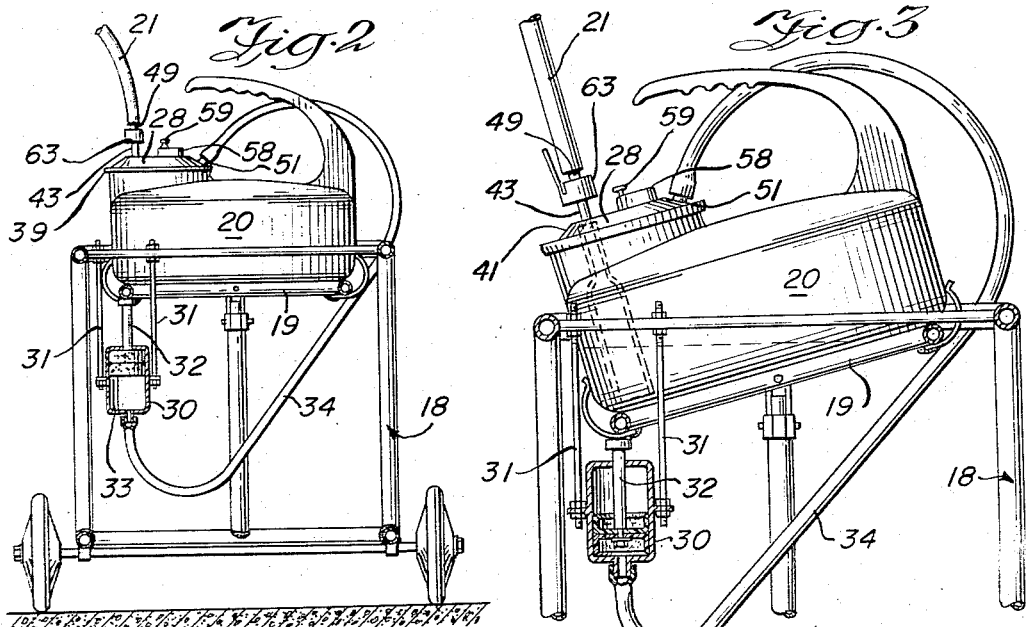
INVENTORS
Thomas W. Merritt Sr.
Chester A. Thomas
Robert J. Shulick
BY Hofgren, Wegner, Allen, Stellman & McCord
ATTORNEYS Dec. 20, 1966   T. W. MERRITT, SR., ETAL   3,292,580
VACUUM POSITIONED MILK TRANSFER SYSTEM
Filed May 28, 1965   2 Sheets-Sheet 2
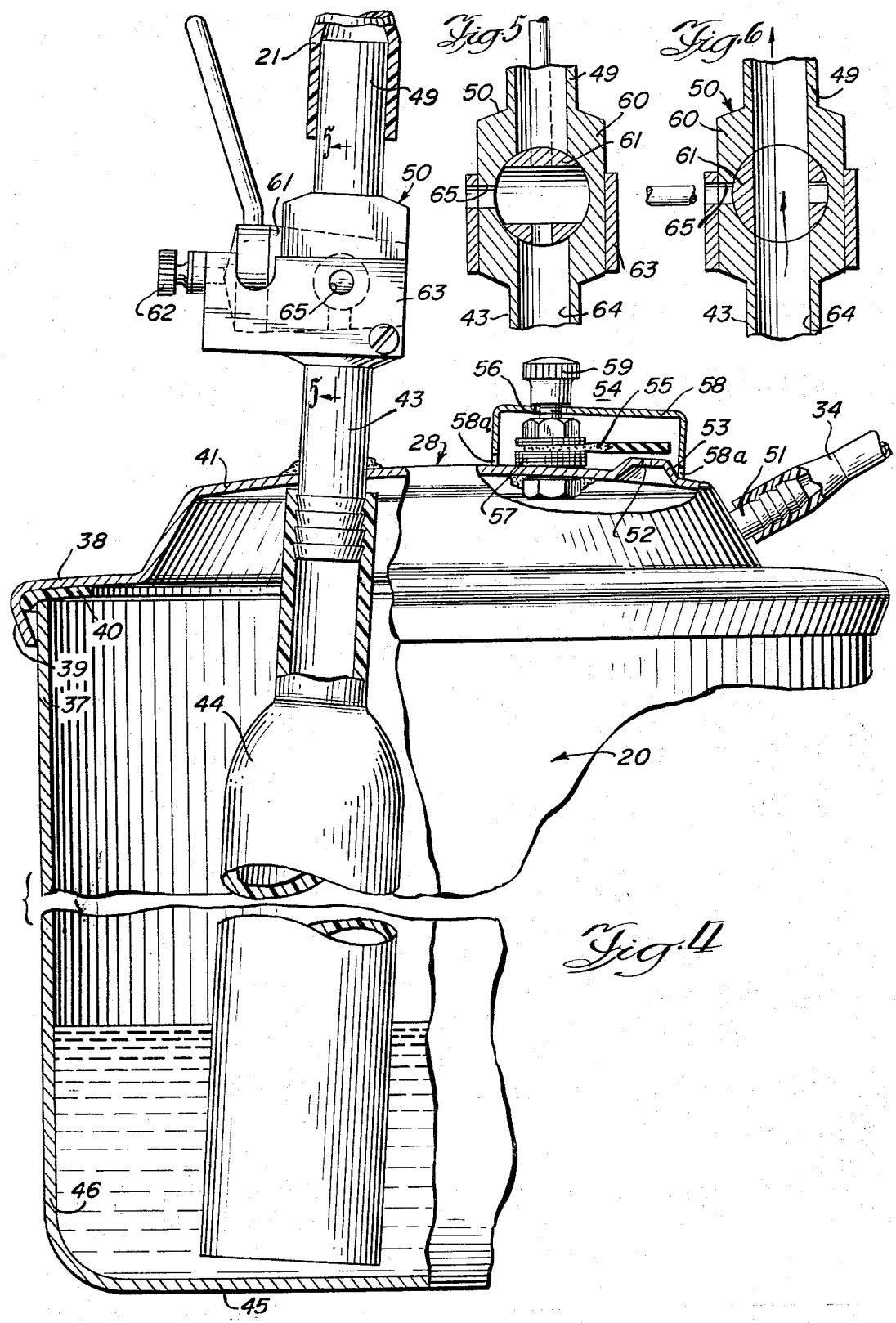

United States Patent Office 3,292,580
Patented Dec. 20, 1966

3,292,580
VACUUM POSITIONED MILK TRANSFER SYSTEM
Thomas W. Merritt, Sr., St. Charles, and Chester A. Thomas, Lake Forest, Ill., and Robert J. Shulick, Newtown, Pa., assignors to Babson Bros. Co., a corporation of Illinois
Filed May 28, 1965, Ser. No. 459,724
13 Claims. (Cl. 119—14.46)

This invention relates to a system for transfer of milk from a bucket milker through a pipeline to a storage means, as a bulk tank, under the influence of vacuum.

During recent years there has been a trend in milking equipment to pipeline systems in which milk flows directly from the cow to a storage tank. Such systems are generally expensive and many dairymen, particularly those with large stanchion barn installations and bucket milkers have found it uneconomical to dispose of their present equipment and convert to a complete carry-away system. Various proposals have been made for transfer systems to move milk from bucket milkers to bulk tanks, without carrying the buckets a long distance. See, for example, Duncan 2,865,391, Sparr 3,016,877 and Babson 3,053,225.

These proposals have had certain disadvantages such as requiring pressure equipment, special pumps or the like, or they have not been well suited for use with the popular suspended bucket milker, such as that shown in McCormack Patent 1,859,213.

The principal object of this invention is the provision of a novel system for transferring milk directly from the bucket milker to a pipeline.

Another object is to provide such a system in which substantially all of the milk is removed from the bucket; and, further, a system in which air is not unnecessarily permitted to enter the evacuated system.

Yet another object is to provide a system utilizing a minimum of specialized equipment so that the major portion of the investment required of the dairyman can be utilized if he later converts to a complete pipeline installation.

One feature of the invention is that the system for transferring milk from a bucket to an evacuated pipeline includes a dip tube extending into the bucket and connected with the pipeline, through which milk is drawn from the bucket into the pipeline and a support for the bucket, operable during removal of milk therefrom, to position the bucket to drain milk into a sump adjacent the dip tube. More specifically, the dip tube is positioned adjacent a wall of the bucket and the bucket is moved from a first or substantially level position, to a second, tilted position, in which milk drains to a point adjacent the end of the tube.

Another feature of the invention is that the system is utilized for transferring milk from a bucket milker which has an opening adjacent one side thereof, and includes a lid for the opening with a dip tube at one edge thereof which extends into the bucket adjacent the wall thereof.

A further feature of the invention is the provision of an air inlet port for the bucket including the normally open valve actuated by a rush of air therethrough to close the valve and seal the interior of the bucket as it is emptied of milk. This prevents the admission of a large quantity of air into the evacuated pipeline which might have an adverse effect on the vacuum level of the entire system.

Still another feature is the provision of a manual valve connected between the dip tube and the pipeline, having a first position in which the interior of the bucket is connected with the pipeline and the second position in which the interior of the bucket is connected with atmosphere and the evacuated pipeline.

Yet a further feature is the provision of a bucket milker lid for a milk transfer system, comprising a lid member for sealed engagement with the opening of the bucket milker and having a dip tube extending downwardly therefrom with means defining an air inlet passage through the lid and a valve for said passage, the valve being responsive to the rate of air flow through the passage and operable to close the passage on occurrence of an air flow greater than a predetermined minimum.

Further features and advantages will readily be apparent from the following specification and from the drawings, in which:

FIGURE 1 is a perspective view of a portion of a milking area of a dairy barn having a milk transfer system embodying the invention;

FIGURE 2 is a sectional view of a wheeled cart utilized in the practice of the invention;

FIGURE 3 is a fragmentary enlarged section, similar to FIGURE 2, showing the bucket milker in a tilted position;

FIGURE 4 is an enlarged fragmentary view, partially in section, illustrating details of the lid, dip tube and air inlet valve;

FIGURE 5 is a sectional view of the manual control valve in position venting the interior of the bucket to atmosphere; and FIGURE 6 is a view similar to FIGURE 5 showing the valve in a position connecting the interior of the bucket with the evacuated milk line.

It is generally acknowledged to be undesirable to carry milk a long distance from the point of milking to a storage tank or cans. In addition to the labor involved, the opportunity for contamination is greatly increased with handling of the milk and its exposure to air. Pipeline milking systems eliminate milk handling labor and, when properly designed and maintained, contribute to the sanitary production of milk. However, a complete pipeline milking system represents a major investment which many dairy farmers are unwilling or unable to make. In some instances conversion to a pipeline milking system would require scrapping a perfectly good bucket milking installation.

The milk transfer apparatus of this invention permits delivery of milk directly from a bucket milker through a pipeline to a storage tank with maximum safety, little labor and a relatively small investment. Furthermore, much of the equipment utilized in the milk transfer system can be incorporated in a full carry-away system at a later date.

Turning now to the drawings, and particularly to FIGURE 1, a portion of a stanchion dairy barn is illustrated with cows 10 standing on a platform 11 and held by stanchions 12. An operator's walk 13 is separated from the cow platform by a gutter 14. It will be understood that a second row of cows will normally be located on the other side of the operator's walk. A carry-away milk line 15 is supported over the head of the operator and extends generally along the walk so that it is readily accessible. The milk line may be connected directly with an evacuated storage tank, or through a suitable evacuated releaser mechanism with a non-evacuated container. In any event, milk is drawn into and through the line by vacuum.

The operator is provided with a wheeled cart 18 which may readily be moved to various locations within the barn. Cart 18 has a platform 19 on which a bucket milker 20 is supported while the milk is withdrawn therefrom. As will appear, platform 19 tilts so that the milk drains to one corner of the bucket and can be substantially completely removed. Milker 20 is connected through a hose 21 with a valve 22 on the milk line 15. Similar valves may be provided at convenient intervals throughout the milking area so that the cart may be positioned for convenient handling of milk from the various animals.

An upright post 24 on the cart supports a scale 25 and a chart 26. Each bucket of milk may be weighed and the weight of the milk recorded before it is transferred to the milk line.

Briefly, after the cow is milked out, bucket 20 is removed and the milker lid, not shown, is removed. The bucket is then weighed and the weight recorded. The scale 25 may have a built-in offset to compensate for the weight of the bucket so that the weight of the milk is read directly. The bucket is then placed on platform 19 which is in a level position. Milk transfer lid 28 with hose 21 attached is placed on the milker bucket and the interior of the bucket is connected with the evacuated milk line. As milk is withdrawn from the bucket, platform 19 is tilted to drain the milk to a point where it may be withdrawn. When the bucket is emptied, a check valve closes, preventing a rush of air through the bucket into the pipeline. The connection of the bucket with the pipeline is then closed, air admitted to the bucket to release the transfer lid and the lid removed. The bucket is then used for milking the next cow.

Further details of the apparatus will now be described in connection with FIGURES 2 and 3. In FIGURE 2, bucket 20 is supported on tilting platform 19 which is shown in its level position. Milk transfer lid 28 is mounted on the opening at the top of the neck of the bucket milker, adjacent one wall of the milker. The center of gravity of the bucket milker is somewhat to the left of center as viewed in FIGURE 2. Pivoted support platform 19 is maintained in a level position by pneumatic piston and cylinder device 30 suspended on rods 31 below the platform. Piston 32 has a rod 32a which extends upwardly and engages the underside of tilting platform 19 beneath the neck portion of the milker bucket. Spring 33 within the cylinder has sufficient strength to hold even a completely filled bucket up in the level position. The interior of the cylinder is connected through a hose 34 with lid 28 so that a vacuum present in the bucket acts on the underside of the piston. This draws the piston downwardly to the position of FIGURE 3 allowing the platform 19 to tilt, as shown in FIGURE 3. In the tilted position, milk within the bucket drains toward the low corner so that it may all be removed. The bucket is not moved to the tilted position until lid 28 is sealed in place by the vacuum within the bucket. If the bucket were tilted before the lid was sealed, milk could spill from a full bucket.

As will appear in more detail, when the milk is all withdrawn from the bucket, an air inlet port is closed to prevent a large quantity of air from entering the milk line. When the bucket is emptied, the operator breaks the connection between the bucket and the milk line and admits air to the bucket relieving the vacuum therein. This permits removal of the lid and releases the piston so that spring 33 can return pivoted platform 19 to its level position.

Details of the construction of the transfer lid are illustrated in FIGURE 4. The lid is circular in configuration to match the circular neck 37 of bucket 20. It has a flat annular portion 38 surrounded by a depending flange 39 within which a sealing gasket 40 is held. The central lid portion 41 extends upwardly forming a crown. A nipple 43 is secured in the upper portion of the lid adjacent one edge of the crown portion and extends within the lid to receive a pick-up tube 44. The pick-up tube, which may be of rubber, extends downwardly to a point adjacent the juncture of bottom 45 and sidewall 46 of the bucket. When the bucket is properly positioned on the cart and platform 19 is tilted, the milk within the bucket collects at the corner between bottom 45 and sidewall 46, which in effect form a sump, facilitating the flow of substantially all the milk into the pick-up tube.

Nipple 43 has an upper end 49 to which hose 21 is connected. A manual valve 50 controls the application of vacuum and the admission of air to the bucket. The valve has two positions, in one of which the interior of the bucket is connected with hose 21, which is evacuated when it is connected with the milk line. In the other position, the connection with hose 21 is closed off and air is admitted to the bucket.

A nipple 51 on the rear wall of transfer lid 28 has hose 34 connected thereto, transmitting the pressure condition within the bucket to the pneumatic piston and cylinder device 30.

To allow milk to flow readily from the bucket it is necessary to admit air thereto. An air port 52 is provided in a raised, flat surfaced projection 53 on the milker lid. When the milk is emptied from the bucket, it is desirable to close the air inlet to avoid the admission of air through the bucket to the evacuated milk line. A flapper valve 54 has a valve member 55, a flexible sheet of rubber or the like, secured to a post 56 adjacent air inlet 52. The body of valve member 55 overlies the air inlet port 52 and is spaced therefrom. The rate of flow of incoming air to replace milk as it is withdrawn is insufficient to affect the position of valve 55. However, when the milk is exhausted the rate of flow of air increases markedly, drawing valve member 55 down to seat on the flat surface surrounding aid inlet 52. The position of valve member 55 may be adjusted for proper operation by changing the number of washers 57 which space it from the surface of the lid. A cover 58 for the inlet port is held by a cap nut 59 on post 56. Air is admitted through openings 58a.

Manual valve 50 is illustrated in FIGURES 5 and 6. Valve body 60 is formed integrally with nipple 43. A rotatable valve plug 61 is held therein by a thumb screw 62 threaded into strap 63. The nipple and valve block have a central passage 64 therethrough. An air inlet port 65 extends laterally through the valve lock. In the position of valve plug 61 in FIGURE 5, the air inlet 65 is connected through the porting of the valve plug with the interior of the bucket, admitting air thereto and relieving the vacuum in the bucket, permitting removal of lid 28. In the position of FIGURE 6, the large bore of the plug is aligned with the bore 64 through the valve body, connecting the interior of the bucket with the evacuated milk line. The air inlet is closed in this position of the valve.

While we have shown and described certain embodiments of our invention, it is to be understood that it is capable of many modifications. Changes, therefore, in the construction and arrangement may be made without departing from the spirit and scope of the invention as disclosed in the appended claims.

We claim:

1. A system for transferring milk from a bucket to an evacuated pipeline, comprising: a milk evacuation dip tube extending into a bucket and connected with said evacuated pipeline, through which milk is drawn from the bucket into the pipeline; a tiltable support means for said bucket; and means for tilting said support in response to evacuation of said bucket, to position the bucket to drain milk into a sump adjacent the end of said dip tube.

2. The milk transfer system of claim 1 wherein said dip tube is positioned adjacent a wall of said bucket and said support is operable to move the bucket from a first, substantially level position to a second, tilted position in which milk drains to a point adjacent the tube.

3. The milk transfer system of claim 1 wherein said support is actuated by a pneumatic piston and cylinder device connected with and responsive to the level of vacuum within said bucket.

4. A system for transferring milk from a bucket milker having a body with an opening adjacent one wall thereof, to an evacuated pipeline, comprising: a lid for the opening of said bucket; a milk evacuation dip tube mounted on said lid, at one edge thereof and extending into the bucket adjacent the wall thereof, said dip tube being connected with the evacuated pipeline and the milk being withdrawn therethrough for transfer into the pipeline; tiltable support means for said bucket, and means operable in response to evacuation of said bucket and during removal of milk therefrom to tilt said support means and position the bucket to drain milk into the corner adjacent said wall and the bottom of the bucket.

5. The milk transfer system of claim 4 wherein said support is operable to move said bucket from a first, substantially level position to a second, tilted position to drain the milk to a point adjacent the end of the dip tube and wherein the support is actuated by a pneumatic piston and cylinder device connected with said lid and responsive to the level of vacuum within said bucket.

6. The apparatus of claim 4 wherein said lid has an air inlet opening therethrough and including a normally open valve actuated by a rush of air through said inlet to close the valve and seal the interior of the bucket as the milk is exhausted therefrom.

7. The system of claim 6 wherein said valve includes a valve seat having an air inlet port opening therethrough with a flexible sheet valve member supported at one edge and positioned adjacent thereto in alignment with said port.

8. The milk transfer system of claim 4 wherein said lid is provided with a manual valve in the connection between the dip tube and the pipeline, the manual valve having a first position connecting the interior of the bucket with the pipeline and a second position connecting the interior of the bucket with atmosphere.

9. A system for transferring milk from a bucket milker having a body with an opening adjacent one wall thereof, to an evacuated pipeline, comprising: a lid for the opening of said bucket; a milk evacuation dip tube mounted on said lid, at one edge thereof and extending into the bucket adjacent the wall thereof, said dip tube being connected with the evacuated pipeline and the milk being withdrawn therethrough for transfer into the pipeline; a pivoted platform supporting said bucket and operable to move the bucket from a first, substantially level position to a second, tilted position to drain the milk in the bucket to a point at the juncture of said one wall and the bottom of the bucket, adjacent the end of the dip tube; a pneumatic piston and cylinder device connected with said lid and operable to control movement of said platform between said first position when said bucket is at atmospheric pressure and said second position when said bucket is evacuated; means in said lid defining an air inlet therethrough and including a normally open valve actuated by a rush of air through said support to close the inlet and seal the interior of the bucket as the milk is exhausted therefrom; and a manual valve in the connection between the dip tube and the pipeline, the manual valve having a first position connecting the interior of the bucket with the pipeline and a second position connecting the interior of the bucket with atmosphere.

10. The milk transfer apparatus of claim 1 including means defining an air inlet port for said bucket with a normally open valve associated therewith, said valve being actuated by a rush of air through the inlet port to close and seal the interior of the bucket as milk is exhausted therefrom.

11. The system of claim 10 wherein said valve includes a valve seat having the air inlet port opening therethrough with a flexible sheet valve member supported at one edge and positioned adjacent thereto in alignment with said port.

12. A bucket milker lid for the milk transfer system of claim 1, comprising: a lid member for sealing engagement with the opening of a bucket milker with said dip tube extending downwardly from said lid; means defining an air inlet passage through said lid; and a valve for said passage, responsive to the rate of air flow therethrough, operable to close said passage on occurrence of an air flow greater than a predetermined minimum.

13. The milk transfer system of claim 4 wherein said lid is provided with a manual valve in the connection between the dip tube and the pipeline, the manual valve having a first position connecting the interior of the bucket with the pipeline and the second position connecting the interior of the bucket with atmosphere.

References Cited by the Examiner
UNITED STATES PATENTS

| | | | |
|---|---|---|---|
| 2,455,523 | 12/1948 | Rodack | 137—142 X |
| 2,527,849 | 10/1950 | Ranney | 137—205 |
| 2,692,576 | 10/1954 | Rapp | 119—14.54 |
| 2,733,667 | 2/1956 | Hill | 103—236 |
| 2,793,612 | 5/1957 | Babson | 119—14.03 |
| 2,809,650 | 10/1957 | Anderson | 137—147 X |
| 2,829,657 | 4/1958 | Bender | 134—56 |
| 2,853,050 | 9/1958 | Golay | 119—14.46 X |
| 2,865,391 | 12/1958 | Duncan | 137—205 |
| 2,982,247 | 5/1961 | Varese et al. | 119—14.11 |
| 3,008,450 | 11/1961 | Brunson | 119—14.05 |

SAMUEL KOREN, *Primary Examiner.*

ALDRICH F. MEDBERY, *Examiner.*